United States Patent
Kim

(10) Patent No.: US 9,709,684 B2
(45) Date of Patent: Jul. 18, 2017

(54) SYSTEMS AND METHODS FOR SCINTILLATORS HAVING MICRO-CRACK SURFACES

(71) Applicant: General Electric Company, Schenectady, NY (US)

(72) Inventor: Chang Lyong Kim, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 14/570,040

(22) Filed: Dec. 15, 2014

(65) Prior Publication Data

US 2016/0170040 A1    Jun. 16, 2016

(51) Int. Cl.
| | |
|---|---|
| G01T 1/20 | (2006.01) |
| G01T 1/202 | (2006.01) |
| G01T 1/29 | (2006.01) |
| B23K 26/00 | (2014.01) |
| B23K 26/352 | (2014.01) |
| B28D 5/00 | (2006.01) |
| G01T 1/164 | (2006.01) |
| B23K 103/00 | (2006.01) |

(52) U.S. Cl.
CPC ........ *G01T 1/2002* (2013.01); *B23K 26/0006* (2013.01); *B23K 26/0066* (2013.01); *B23K 26/352* (2015.10); *B28D 5/00* (2013.01); *G01T 1/1644* (2013.01); *G01T 1/202* (2013.01); *G01T 1/2006* (2013.01); *G01T 1/2985* (2013.01); *B23K 2203/50* (2015.10)

(58) Field of Classification Search
CPC ..... G01T 1/2002; G01T 1/2006; G01T 1/202; G01T 1/2985
See application file for complete search history.

(56) References Cited

U.S. PATENT DOCUMENTS

| | | |
|---|---|---|
| 4,733,083 A | 3/1988 | Wong |
| 4,743,764 A | 5/1988 | Casey et al. |
| 4,749,863 A | 6/1988 | Casey et al. |
| 5,091,650 A | 2/1992 | Uchida et al. |
| 5,210,420 A | 5/1993 | Hartz et al. |

(Continued)

OTHER PUBLICATIONS

Moriya, T., Development of PET delectors Using Monolithic Scintillation Crystals Processed With Sub-Surface Laser Engraving Technique; IEEE Transactions on Nuclear Science, vol. 57, No. 5, Oct. 2010; pp. 2455-2459.

(Continued)

*Primary Examiner* — David Porta
*Assistant Examiner* — Djura Malevic
(74) *Attorney, Agent, or Firm* — Dean D. Small; The Small Patent Law Group, LLC

(57) ABSTRACT

A scintillator crystal array that is configured to receive rays emitted by an object to be imaged and to emit light energy responsive to the received rays includes plural crystals. At least one of the crystals includes an upper surface, a lower surface disposed opposite the upper surface, plural sides extending between the upper surface and the lower surface, and a micro-crack surface extending at least partially along at least one of the sides. The micro-crack surface includes micro-cracks formed in the crystal configured for controlling distribution of light through the crystal.

21 Claims, 5 Drawing Sheets

(56) References Cited

U.S. PATENT DOCUMENTS

| | | | |
|---|---|---|---|
| 5,227,634 A | 7/1993 | Ryuo et al. | |
| 5,300,782 A * | 4/1994 | Johnston | G01T 1/2002 |
| | | | 250/363.03 |
| 6,087,663 A * | 7/2000 | Moisan | G01T 1/2002 |
| | | | 250/367 |
| 7,088,901 B2 | 8/2006 | Kim et al. | |
| 7,371,596 B2 * | 5/2008 | Warner, Jr. | B23K 26/0066 |
| | | | 257/E21.347 |
| 7,709,805 B2 * | 5/2010 | Burr | G01T 1/1611 |
| | | | 250/370.08 |
| 8,344,872 B2 * | 1/2013 | Minckler | G07B 17/00661 |
| | | | 340/501 |
| 8,779,371 B2 * | 7/2014 | Moriya | G21K 4/00 |
| | | | 250/370.11 |
| 8,809,794 B2 * | 8/2014 | Uchida | G01T 1/202 |
| | | | 250/361 R |
| 8,866,089 B2 * | 10/2014 | Perna | G01T 1/2006 |
| | | | 250/366 |
| 9,012,854 B2 * | 4/2015 | Wieczorek | G01T 1/2002 |
| | | | 250/362 |
| 9,040,924 B2 * | 5/2015 | Lewellen | A61B 6/037 |
| | | | 250/361 R |
| 9,442,198 B2 * | 9/2016 | Lewellen | A61B 6/037 |
| 2004/0262526 A1 * | 12/2004 | Corbeil | B23K 26/402 |
| | | | 250/367 |
| 2005/0023733 A1 * | 2/2005 | Burr | G01T 1/1611 |
| | | | 264/400 |
| 2010/0012846 A1 * | 1/2010 | Wang | G01T 1/1642 |
| | | | 250/362 |
| 2011/0221723 A1 * | 9/2011 | Kurokawa | G06F 3/042 |
| | | | 345/207 |
| 2012/0235047 A1 * | 9/2012 | Lewellen | A61B 6/037 |
| | | | 250/366 |
| 2013/0299710 A1 * | 11/2013 | Uchida | G01T 1/202 |
| | | | 250/366 |
| 2014/0084170 A1 * | 3/2014 | Wieczorek | G01T 1/2002 |
| | | | 250/362 |
| 2015/0226862 A1 * | 8/2015 | Lewellen | A61B 6/037 |
| | | | 250/366 |
| 2016/0209517 A1 * | 7/2016 | Cooke | G01T 1/2002 |

OTHER PUBLICATIONS

USPTO Office Action Dated Jun. 2, 2015, for U.S. Appl. No. 14/173,569, filed Feb. 5, 2014, 12 Pages.

* cited by examiner

SYSTEMS AND METHODS FOR SCINTILLATORS HAVING MICRO-CRACK SURFACES

BACKGROUND OF THE INVENTION

The subject matter disclosed herein relates generally to imaging systems and techniques, and more particularly to crystals used in scintillators.

In certain types of imaging devices, such as positron emission tomography (PET) scanners, arrays of detector elements are used to detect radiation emanating from the patient. In a PET scanner, for example, arrays of scintillator crystals may be used to detect annihilation photons which are generated inside the patient. The annihilation photons are produced when a positron emitted from a radiopharmaceutical injected into the patient collides with an electron causing an annihilation event. The scintillator crystals receive the annihilation photons and generate photons in response to the annihilation photons, with the photons emitted to a photosensor configured to convert the light energy from the photons to electrical energy used to reconstruct an image.

Timing resolution of a time of flight (TOF) PET detector may depend on a number of components, including scintillation crystals and photosensors, and how the scintillation crystals and photosensors are combined into a detector along with readout electronics. Factors relating to the combination of the scintillation crystals and photosensors that may affect timing resolution include, for example, the light sharing scheme among the crystals and photosensors, the layout of photosensors, transit time spread between the photosensors, signal trace layout on amplifier board, and electronics noise, for example.

Because of the high speeds of photons (e.g., the speed of light) and relatively short distances traveled by the photons during imaging, the timing resolution of detectors is critical to imaging. This is even more so as demands for higher resolution increase.

BRIEF DESCRIPTION OF THE INVENTION

In accordance with various embodiments, a scintillator crystal array that is configured to receive rays emitted from an object to be imaged and to emit light energy responsive to the received rays is provided. The scintillator crystal array includes plural crystals. At least one of the crystals includes an upper surface, a lower surface disposed opposite the upper surface, plural sides extending between the upper surface and the lower surface, and a micro-crack surface extending at least partially along at least one of the sides. The micro-crack surface includes micro-cracks formed in the crystal configured for controlling distribution of light through the crystal.

In accordance with various embodiments, a detector system for imaging an object is provided including a scintillator block and a photosensor. The scintillator block is configured to receive rays from an object to be imaged and to emit light energy responsive to the received rays. The scintillator block includes a scintillator crystal array configured to receive rays emitted by the object and to emit light energy responsive to the received rays, with the scintillator crystal array comprising plural crystals. At least one of the crystals includes an upper surface, a lower surface disposed opposite the upper surface, plural sides extending between the upper surface and the lower surface, and a micro-crack surface extending at least partially along at least one of the sides, the micro-crack surface comprising micro-cracks formed in the crystal configured for controlling distribution of light through the crystal. The at least one photosensor is configured to receive the light energy emitted from the scintillator crystal array.

In accordance with various embodiments, a method for providing a scintillator for imaging an object is provided. The method includes providing at least one crystal. The crystal includes an upper surface, a lower surface disposed opposite the upper surface, plural sides extending between the upper surface and the lower surface, and a micro-crack surface extending at least partially along at least one of the sides, the micro-crack surface comprising micro-cracks formed in the crystal configured for controlling distribution of light through the crystal. The method also includes assembling the at least one crystal with plural additional crystals to form a scintillator crystal array. Further, the method includes providing a reflector disposed around the sides of the scintillator crystal array, the reflector disposed around the sides of the crystal array and configured to reflect light directed from the sides of the scintillator crystal array back into the scintillator crystal array.

DETAILED DESCRIPTION OF THE INVENTION

Figure 1:
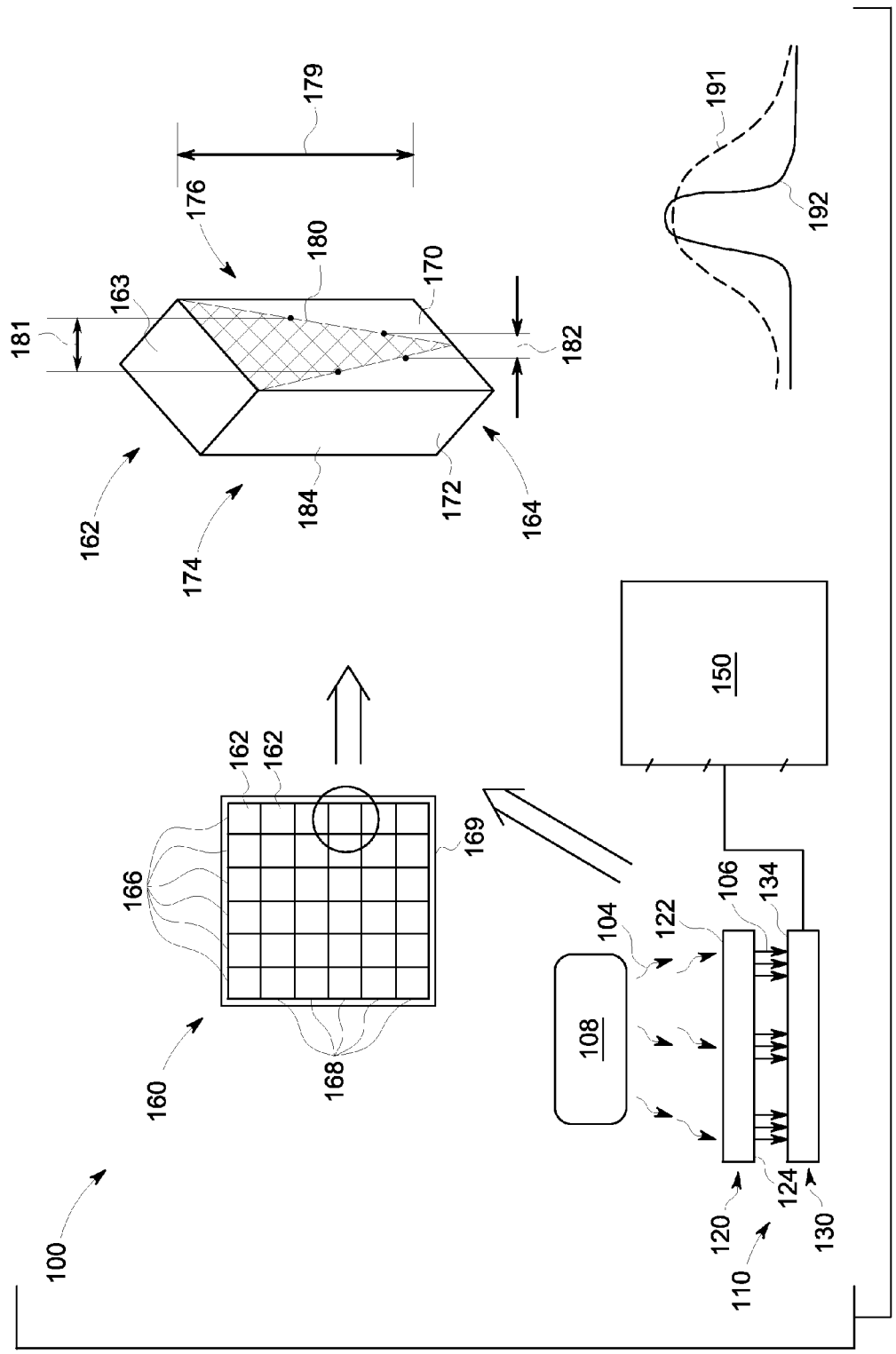
FIG. 1 is a schematic diagram of an imaging system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof. "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems," "units," or "modules" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide crystal arrays for scintillators for imaging systems, where at least some of the crystals include a micro-crack surface extending along a side. Various embodiments provide for improved light output among crystals of an array, or improved light output enhancement, using a non-mechanical process (e.g., using lasers to provide micro-cracks in contrast to mechanical processes such as surface roughening).

Laser engraving technology has been employed in connection with monolithic crystal block detectors, used to form separate sub-blocks within the monolithic crystal block. However, such technology is generally limited to relative small crystal blocks due to limitations regarding depth of penetration of the laser. For deeper depths, forming micro-cracks becomes more difficult as focusing the laser beam in a small spot in the crystal becomes difficult, and also due to absorption of laser energy by the crystal and resulting reductions in laser intensity.

In contrast to such use of lasers with monolithic crystal blocks of relatively small size (e.g., to form sub-blocks within a monolithic block), various present embodiments utilize lasers to form micro-cracks on or near the surface of individual crystals which will later be joined in a crystal array (e.g., to provide a controlled increase in light distribution between or among the crystals of an array). Further, the micro-cracks are not employed to separate monolithic blocks into sub-blocks, but instead micro-cracks are formed to control light distribution through the crystal. In some embodiments, micro-crack surfaces are formed on or near an exterior side of a crystal, with the individual crystal configured to be joined in a crystal array with other crystals. In various embodiments, micro-crack surfaces are configured to behave similar to roughened surfaces, and may be employed in a generally similar fashion to roughened surfaces described in U.S. patent application Ser. No. 14/173,569, filed Feb. 5, 2014, entitled "Systems and Methods for Scintillators Having Polished and Roughened Surfaces" ("the 569 Application"), which is incorporated by reference herein in its entirety. For example, in various embodiments, micro-crack surfaces may be oriented relative to sides not having micro-crack surfaces associated therewith generally similar to orientations of roughened surfaces relative to polished surface described in the 569 Application. (See, e.g., 569 Application at FIGS. 2 and 3 and related discussion.)

For embodiments utilizing micro-cracks formed on a surface of an exterior side of a crystal, a relatively low powered laser may be employed (e.g., a lower power than required for a laser utilized for sub-surface engraving) with faster processing and lower cost.

A technical effect of at least some embodiments provides improved detector performance. For example, a technical effect of at least some embodiments includes improved light output of a scintillator crystal array. As another example, a technical effect of at least some embodiments provides improved timing resolution of a scintillator crystal array. A technical effect of at least some embodiments provides for improved control of light output and/or light distribution control for crystals of an array (e.g., via an automated process utilizing a laser to form micro-cracks). A technical effect of at least some embodiments includes improved flexibility in enhancement of light output (e.g., via improved control of patterns through use of laser instead of mechanical roughening). A technical effect of at least some embodiments includes improved providing of depth of interaction (DOI) information (e.g., achieved via the pattern or shape of a micro-crack surface).

FIG. 1 provides a schematic diagram of an imaging system 100 in accordance with various embodiments. The imaging system 100 includes a detector 110 and a processing unit 150. The detector 110 includes a scintillator block 120 and a photosensor 130. In the illustrated embodiment, the scintillator block 120 and the photosensor 130 form a positron emission tomography (PET) detector. However, in other embodiments, the scintillator block 120 and the photosensor 130 may additionally or alternatively be used with one or more other imaging modalities, such as single-photon emission computed tomography (SPECT), for example. It may be noted that one or more the various components or units of FIG. 1, although depicted as physically separate units or components, may in various embodiments be configured as more than one component or unit and/or be combined with another component or unit. For example, the photosensor 130 and one or more aspects of the processing unit 150 may be configured as a single unit.

Generally, in the illustrated embodiment, the imaging system 100 may be used to provide an image (e.g., a PET image) of the object 108. The object 108, for example, may be a portion of a human or animal patient. In the illustrated embodiment, the object 108 emits annihilation photons 104 due to the introduction of a radiopharmaceutical. The annihilation photons 104 are sensed by the detector 110 and used to reconstruct an image. The emitted ray may be a gamma ray produced by a transition in the nucleus of an atom or by annihilation of a positron emitted by radioactive material.

The depicted scintillator block 120 produces light photons 106 responsive to the impact of annihilation photons 104 upon the scintillator. The light photons 106 from the scintillator block 120 impact the photosensor 130. The photosensor 130 is configured to produce electric charge responsive to the impingement of light photons 106 from the scintillator upon a light reception surface 134 of the photosensor 130. The electric charge generated responsive to the reception of light may be measured (e.g., by the processing unit 150), and used to determine the amount of light impinging upon a given portion of the photosensor 130, such as one or more pixels. The amount of light impacting the various portions of the photosensor 130 may be used to identify the location where the annihilation photon interacted in the scintillator block 120. The total amount of light impacting the photosensor 130 may be used to determine the energy and timing of the annihilation photon.

The scintillator block 120 is configured to receive the annihilation photons 104 emitted by the object 108 and to emit light photons 106 responsive to reception of the annihilation photons 104. It may be noted that a large number of light photons may be produced for each annihilation photon that impacts the scintillator block 120. It may also be noted that in the schematic depiction of FIG. 1 the scintillator block 120 is shown at a distance from the photosensor 130; however, the scintillator block 120 and photosensor 130 may be joined in various embodiments. Further, in some embodiments, a light guide may be provided. The light guide may be configured as a transparent interface between the scintillator block 120 (e.g., crystals of the scintillator block 120) and the photosensor 130, for example where the surface areas of the scintillator block 120 and the photosensor 130 are not the same. In the illustrated embodiment, the scintillator block 120 includes a reception surface 122 and an emission surface 124. The reception surface 122 is oriented toward the object 108, and the emission surface 124 is oriented toward the photosensor 130. Generally, in various embodiments; a ray (e.g., annihilation photon) impacts the reception surface 122, and enters the scintillator block 120. After traveling a distance in the scintillator block 120, the annihilation photon interacts with the scintillator 220 producing a large number of light photons. A portion of these light photons 160 are emitted from a corresponding portion of the emission surface 124 to the photosensor 130. It may be noted, as also discussed below, that the emission surface and reception surface of the scintillator block 120 may be oriented in different directions in various alternate embodiments (e.g., both the emission surface and the reception surface may be oriented upwards toward the object being imaged in some embodiments). As another example, the reception surface and emission surface may be disposed at an angle with respect to each other in various embodiments (e.g., the reception surface may be perpendicular to the emission surface).

The photosensor 130 is configured to receive the light photons 106 from the scintillator block 120, and convert received light photons to electric charge. The light energy may be converted and collected by specific portions of the photosensor 130 that receive the energy (e.g., pixels), and the collected charge used to provide a measure of the rays received by the detector on a per pixel basis.

A top view of the scintillator block 120 is seen in the top center of FIG. 1. The depicted scintillator includes an array 160 of individual crystals 162. The scintillator block 120 includes a reflector member 169. The reflector member 169 covers all the surfaces of the array 160 excluding the emission surface 124, and is configured to reflect light generated by the crystals 162 directed from the sides of the array 160 back into the array 160. Thus, the light generated from the array 160 may be prevented from escaping from the sides of the array 160, increasing the proportion of the light created by the scintillation event that is emitted from the emission surface 124 toward the photosensor 130. In the illustrated embodiment, the scintillator block 120 is shown having a single array 160 for ease of illustration; however, it may be noted that plural arrays 160 may be assembled together to form the scintillator block 120 (with each array 160 surrounded by a corresponding reflector member 169 disposed around the sides of the array 160), for example to form a panel of the scintillator block 120. The depicted array 160 of crystals 162 is arranged in columns 166 and rows 168. In various embodiments, different numbers of columns and/or rows may be employed, or different arrangements of crystals may be employed.

As seen in the perspective view of an individual crystal 162 on the right hand side of FIG. 1, the depicted individual crystal 162 includes an upper surface 163 and a lower surface 164. The upper surface 163 and the lower surface 164 are disposed opposite of each other and are separated by sides. In the illustrated embodiment, the upper surface 163 is configured to form part of the reception surface 122 of the scintillator block 120, and the lower surface 164 is configured to form part of the emission surface 124 of the scintillator block 120. Thus, in the illustrated embodiment, the upper surface 163 is configured as a reception surface and the lower surface 164 is configured as an emission surface. It may be noted that other arrangements may be utilized in alternate embodiments. For example, a single surface (e.g., the upper surface 163) may be configured as both a reception surface and an emission surface. As another example, one or more of the sides extending between an upper and lower surface may be configured as a reception and/or emission surface. (See, e.g., FIG. 3 and related discussion.) It should also be noted that the use of "upper" and "lower" surfaces herein is used for clarity and ease of description and illustration of opposed surfaces separated by sides, and is not intended to imply any specific orientation requirements. For example, a particular crystal or array may be rotated or otherwise position so that an "upper" surface points downward, or to a side.

The crystal 162 is configured to scintillate, or produce light energy responsive to rays (e.g., annihilation photons) received by the crystal 162. In the illustrated embodiment, the crystal 162 has four sides extending between the upper surface 163 and the lower surface 164, defining a generally rectangular cross-section. The crystal 162 includes a first side 170, a second side 172, a third side 174 (the third side 174 is disposed opposite the first side 170), and a fourth side 176 (the fourth side 176 is disposed opposite the second side 172). The crystal 162 may be made, as one example, of Lutetium Yttrium Silicate (LYSO), or, as another example, of Bismuth Germanium Oxide (BGO; $Bi_4Ge_3O_{12}$).

Generally, in various embodiments, a micro-crack surface (e.g., a surface having micro-cracks formed with a laser) may extend at least partially along at least one of the sides 170, 172, 174, 176, which may be smooth or polished. The micro-crack surface may be disposed on the side along which the micro-crack surface extends, or may be disposed a distance inwardly from the side along which the micro-crack surface extends (e.g., disposed through an interior portion of the crystal). The micro-crack surface is configured to provide improved light distribution relative to a polished surface. Thus, in various embodiments, one side of a crystal in a scintillator crystal array exhibits different light distribution behavior than a different side of the crystal, where one surface finish has micro-cracks associated therewith (e.g., either on or near the surface), and the other surface does not.

In the illustrated embodiment, first side 170 includes a micro-crack surface 180, and the second side 172 includes a polished side surface 184. In FIG. 1, the micro-crack surface 180 is depicted as covering only a portion of the first side 170. In the illustrated embodiment, the width of the micro-crack surface 180 varies along a depth 179 of the crystal 162. For example, the micro-crack surface 180 has a first width 181 at an upper portion that is larger than a second width 182 at the bottom portion, thereby providing different light distribution characteristics at different portions of the crystal (e.g., corresponding to the amount of light spread from one crystal of an array to one or more other crystals of an array), which depends on gamma ray interaction position along the depth 179. Thus, the shape of the micro-crack surface 180 may provide depth of interaction information corresponding to the different distributions of light provided at different portions along the depth 179 of the crystal 162. By varying the width or shape of the micro-crack surface 180 along the depth 179, the distribution of light between or among the crystals varies along the depth 179, which provides identifiable patterns of light distribution associated with different portions along the depth 179 of the crystal 162. For example, in embodiments where the micro-crack surface 180 provides for greater random or Lambertian light distribution than a polished portion of a surface (or, where the polished surface provides specular reflection), the larger width 181 may provide increased transmission of light to adjacent crystals, whereas the smaller width 182 may provide reduced transmission of light to adjacent crystals relative to the larger width 181. This is shown schematically as a first light distribution curve 191 (corresponding to the distribution of light, for example, along an x-axis traversing a crystal array comprising multiple crystals) having a relative wide distribution of light corresponding to the larger width 181, and a second light distribution curve 192 having a relatively narrow distribution corresponding to the smaller width 182. Thus, events having a distribution corresponding to the first distribution curve 191 may be identified as occurring (e.g., having a DOI) at the portion of the depth 179 corresponding to the larger width 181, and events having a distribution corresponding to the second distribution curve 192 may be identified as occurring at the portion of the depth 179 corresponding to the smaller width 182. It may be noted that the particular shapes and distributions shown in FIG. 1 are provided by way of example only, and that other shapes or distributions may be employed in various embodiments. Generally, by varying the width of the micro-crack surface 180 along the depth 179, various locations along the depth 179 may have corresponding distribution signatures or identifiable light distribution patterns which may be used to identify the location along the depth 179 at which a given event occurs.

Thus, variation in the width of the micro-crack surface 180 along the depth 179 may be utilized to provide depth-dependent information, for example to indicate where a gamma ray has struck the crystal or been converted to light by the crystal. Alternatively, the width may be varied to compensate for any differences in distribution caused by the depth at which a gamma ray is absorbed. Thus, instead of providing a different signature for each depth, each depth may have a more similar distribution, which may be used in embodiments for which depth information may not be desired, to provide more consistent light distribution patterns and thereby improve the ability to distinguish gamma ray incidences from noise.

In various embodiments, only one (or a portion of one) of the sides 170, 172, 174, 176 may have a micro-crack surface associated therewith. Different orientations of the micro-crack surfaces of crystals of an array may be employed in different embodiments. These orientations may correspond generally to the orientations described in connection with FIGS. 2 and 3 of the 569 Application. For example, in some embodiments, single micro-crack surfaces of a group of crystals may be oriented toward an interior of the array. As another example, in some embodiments, single micro-crack surfaces of a group of crystals may be oriented in a same direction.

Returning to FIG. 1, the depicted processing unit 150 is configured to receive information (e.g., signals) from multiple detectors 110, and to use the information to reconstruct an image. For example, the processing unit 150 may be configured to use the signal recorded for each pixel of the photosensor 130 to reconstruct an image.

Generally, in various embodiments, the processing unit 150 (and/or any sub-unit or module of the processing unit 150) may be understood as a processing circuitry unit and may include a memory as well as processing circuitry such as one or more field programmable gate array (FPGA), application specific integrated circuit (ASIC), integrated circuit (IC), or microprocessor.

In the illustrated embodiment, the processing unit 150 is configured to read and record the signal measured in each pixel of the photosensor 130 following an exposure to light provided by the scintillator block 120. For example, each pixel may be configured to provide an output voltage representative of the amount of light photons or energy impacting that particular pixel. The recorded signals for each pixel may be used to reconstruct an image. It may be noted that, in reconstructing the image, the processing unit 150 may utilize DOI information (e.g., information corresponding to differences in light distribution at different depths due to a shape of a micro-crack surface).

It should be noted that the arrangement of components in FIG. 1 is provided by way of example for illustrative purposes, and that other arrangements may be employed in various embodiments. For example, different array configurations (e.g., numbers of columns and/or rows, orientation of micro-crack surfaces, shape or size of crystals) may be employed in other embodiments.

As seen in FIG. 1, the depicted micro-crack surface 180 is disposed on the side 170. However, in other embodiments, the micro-crack surface 180 may be disposed on an interior of the crystal, for example at a distance inward of the side along which the micro-crack surface extends. Also, as seen in FIG. 1, the depicted' micro-crack surface 180 extends along the full extent of the depth 179; however, in various embodiments, a micro-crack surface may extend only along a portion of the depth 179. It may further be noted that, in various embodiments, the micro-crack surface 180 may include one or more planar surfaces (e.g., surfaces 214, 224, 234 of FIG. 2) disposed on an interior of the crystal. Further, in some embodiments, the micro-crack surface 180 may include a first planar surface (e.g., surface 180) disposed on the side 170 as well as one or more planar surfaces (e.g., surfaces 214, 224, 234 of FIG. 2) disposed on an interior of the crystal. Use of different numbers or locations of micro-crack surfaces in various embodiments allows for flexibility in control of light distribution to suit particular applications.

Figure 2:
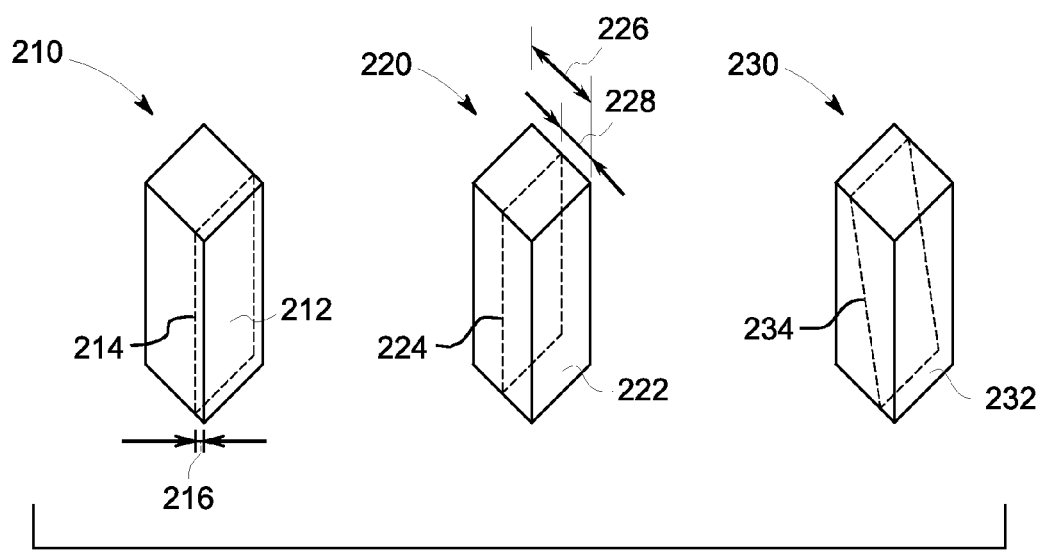
FIG. 2 illustrates example micro-crack surfaces in accordance with various embodiments.

FIG. 2 illustrates example micro-crack surfaces in accordance with various embodiments. For example, crystal 210 includes a micro-crack surface 214 that extends generally parallel to side 212 and is disposed inward of the side 212 by a distance 216. The distance 216, for example, may be between about 1-5 millimeters, to allow for use of a relatively low powered laser. The distance 216, in various embodiments, for example, may be less than 5% of an overall thickness, less than 10% of an overall thickness, or less than 20% of an overall thickness. Generally, the less the distance 216, the lower power of laser may be used. By forming the micro-crack surface 214 at or near the exterior surface of the side 212, a low powered laser may be used with a relatively thick crystal. As shown in FIG. 2, the micro-crack surface 214 has an area that is the same size as the area of the side 212, or extends entirely along the side 212; however, other shapes may be employed for the micro-crack surface 214 in various embodiments.

As also seen in FIG. 2, crystal 220 includes a micro-crack surface 224 that extends generally parallel to side 222 and is disposed inward of the side 222 by a distance 228. The distance 228 is half of the width 226 of the crystal 220, so that the crystal is symmetric about the micro-crack surface 224. Use of such a centrally located micro-crack surface about which the crystal is symmetrical in various embodiments provides for improved assembly of the crystal with other crystals in an array, as less attention is needed to orientation of the crystal 220 due to the symmetry of the location of the micro-crack surface 224. It may be noted that the micro-crack surface 224 is configured for improved distribution of light or improved control of distribution of light within the crystal 220, and not to separate the crystal 220 into separate sub-blocks. As shown in FIG. 2, the micro-crack surface 224 has an area that is the same size as the area of the side 222, or extends entirely along the side 222; however, other shapes may be employed for the micro-crack surface 224 in various embodiments.

As further seen in FIG. 2, crystal 230 includes a micro-crack surface 234 that is disposed inward of the side 232. The micro-crack surface 234, however, is not parallel to side 232, but instead extends at an angle to the side 232. Because the micro-crack surface 234 does not extend parallel to the side 232, the overall area of the micro-crack surface is increased relative to the area that would result from a parallel orientation, which may provide for improved or increased light distribution in various embodiments.

Figure 3:
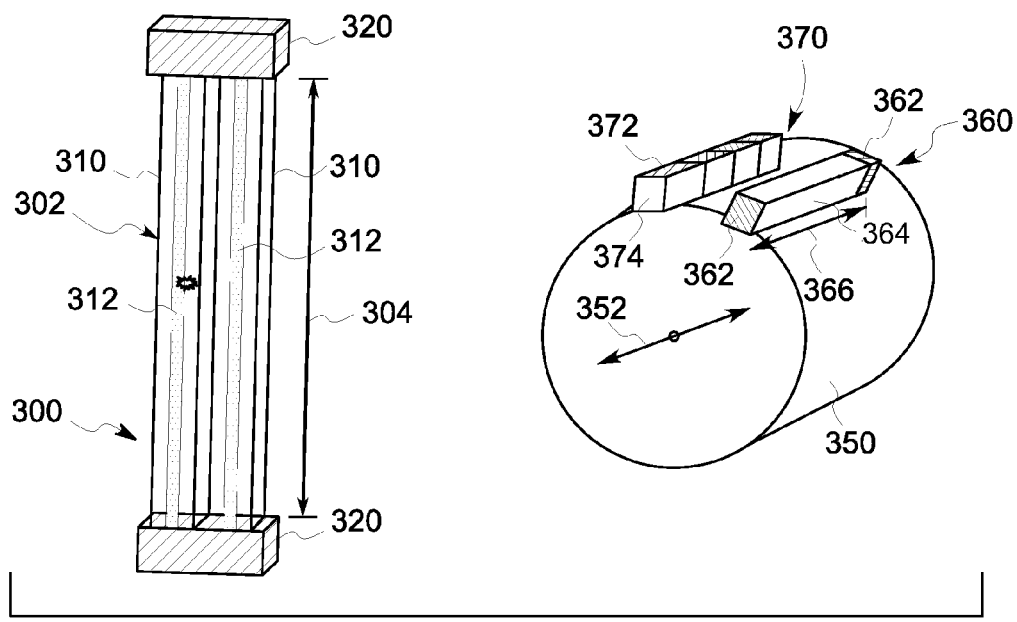
FIG. 3 illustrates example crystal arrangements in accordance with various embodiments.

FIG. 3 illustrates example crystal arrangements in accordance with various embodiments. For example, the detector system 300 includes crystals 310 that extend along depth 304 between photosensors 320. Only 2 crystals 310 are shown for ease of illustration; however, larger arrays may be used in practice (e.g., 8×8). The crystals 310 include micro-crack surfaces 312. The micro-crack surfaces 312 are shown schematically as generally rectangular, but may utilize other shapes to provide depth information. The micro-crack surfaces may be configured as described herein (see, e.g., FIGS. 1 and 2 and related discussion) in connection with various embodiments. The detector system 300 is configured for reception of gamma rays 302 along the depth 304. Incidence of the gamma ray 302 upon one of the crystals 310 results in the generation of light which is transmitted to the photosensors 320. The point along the depth 304 at which a given gamma ray 302 is converted into light may be determined using depth information provided via use of the micro-crack surface 312. The depth 304, for example, in various embodiments may be between about 2 and 15 centimeters. The detector system 300 may be employed, for example, in an axial orientation with a detector ring.

As seen in FIG. 3, detector ring 350 extends along an axis 352. Detector system 360 also extends along the axis 352, and may be configured generally similar to the detector system 300. The detector system 360 is shown in an axial orientation in FIG. 3. The depicted detectors system 360 includes 2 photosensors 362 disposed on either side of crystal 364. The photosensors 362 may be vacuum photomultipliers, avalanche photodiode or silicon photomultipliers, for example. Only one crystal 364, and only a pair of photosensors 362 are shown in FIG. 3 for ease of illustration; however, in practice the crystal 364 may be replaced with an array of crystals having micro-crack surfaces, and a number of photosensors 362. Also, only one detector 360 is shown about the ring 350 in the illustrated example, but multiple detectors may be disposed about the ring 350. The micro-crack surfaces may be configured to provide depth information that may be utilized to determine where along the axis a given gamma ray strikes the detector system or is converted to light.

Use of such an axial orientation facilitated by the provision of depth information by the detector system 360 may reduce the total number of photosensors 362 utilized and thereby reduce the cost of an imaging system. For comparison, a detector system 370 arranged in a transaxial orientation is also shown in FIG. 3. The detector system 370 includes four crystals, each having a photosensor 372 associated therewith. While each crystal 374 only has one photosensor 372 associated therewith, the total of four photosensors 372 is nevertheless twice the total of the two photosensors 362 employed with the detector system 360 for equivalent coverage. Accordingly, in some embodiments, an axial orientation utilizing depth information to locate events along the axis may be employed, for example, to reduce the cost associated with detectors.

Figure 4:
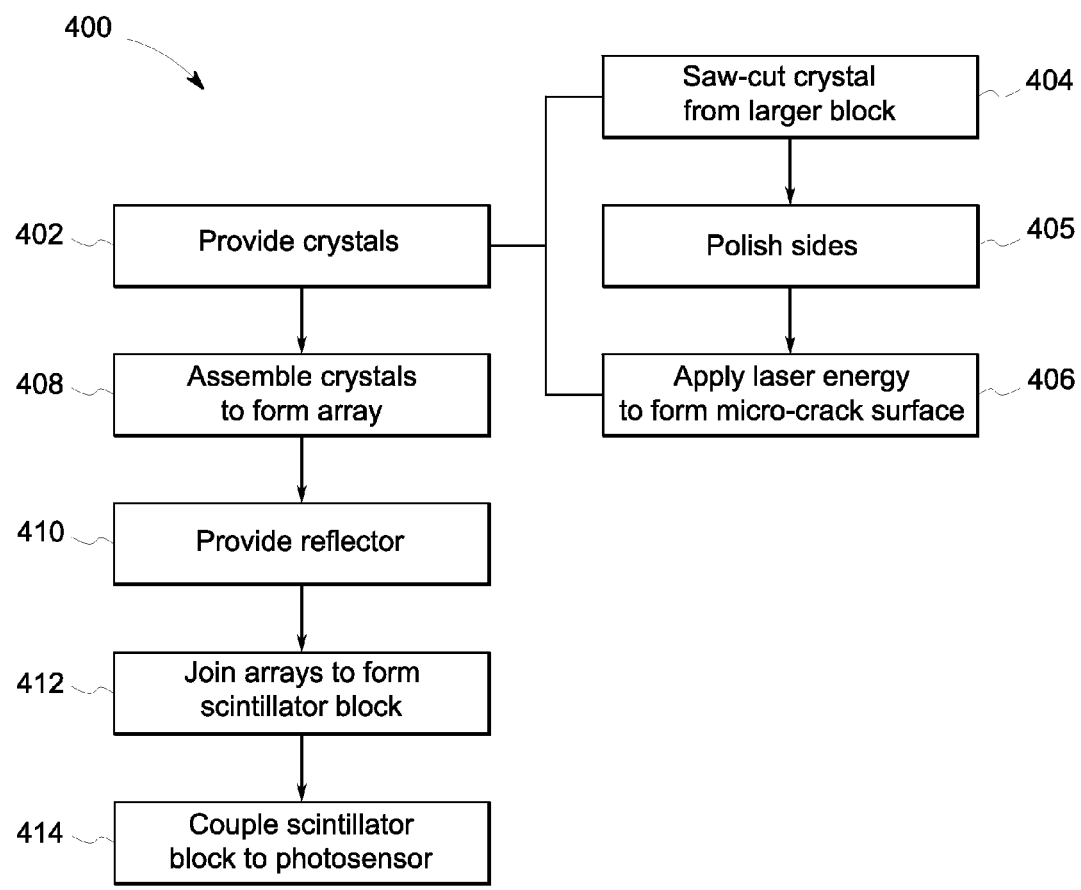
FIG. 4 is a flowchart of a method for forming a detector in accordance with various embodiments.

FIG. 4 provides a flowchart of a method 400 for forming a detector in accordance with various embodiments. The detector, for example, may be configured for use with a PET imaging system. In other embodiments, the detector may be configured for one or more other modalities of imaging additionally or alternatively. The method 400, for example, may employ, include, or related to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 402, crystals to be formed into an array are provided. The crystals each include an upper surface and a lower surface disposed opposite the upper surface. The crystals also include sides extending between the upper surface and the lower surface. At least one of the crystals includes a micro-crack surface as described herein extending at least along a portion of one of the sides. The micro-crack surface may be disposed on the side or inward of the side. In some embodiments, the crystals include four sides and define a rectangular cross-section, with one side having a micro-crack surface associated therewith and the other three sides not having a micro-crack surface associated therewith. By way of example, the micro-crack surfaces may be formed as discussed in connection with steps 404, 405, and 406.

At 404, the crystal is saw cut to a predetermined size from a larger block of crystal material. At 405, the sides of the crystal are polished. In some embodiments, an upper and/or lower surface may also be polished. At 406, a micro-crack surface is formed extending along at least a portion of one of the sides. The micro-crack surface may be disposed on the side in some embodiments, or inwardly (e.g., in an interior portion of the crystal) of the side in other embodiments. As discussed herein, the micro-crack surface may have a varying width along the depth of the crystal to provide depth dependent light distribution information.

At 408, the crystals are assembled to from a crystal array for a scintillator. For example, the crystals may be grouped into 2×3 arrays, or as another example, 3×4 arrays. In some embodiments, the particular orientation of the micro-crack surfaces of the various crystals of the crystal array may be provided in a predetermined orientation. For example, the micro-crack surfaces may be oriented in the same direction. As another example, the micro-crack surfaces may be oriented toward an interior of the array.

At 410, a reflector is provided. The reflector may surround the array along the sides (e.g., extending from a reception surface of the array to an emission surface of the array, and may cover the reception surface), and is configured to reflect light generated by the crystals of the array directed from the sides of the array back into the array. Thus, the light generated from the array may be prevented from escaping from the sides of the array (e.g., into neighboring arrays), increasing the proportion of light emitted from the emission surface of the array. An airgap (or lack of glue) between a reflector and crystal surfaces may be utilized in various embodiments to reduce absorption of light in any optical glue or epoxy.

At 412, plural arrays are joined together to form a scintillator block. For example, a number of arrays formed at 410 may be arranged in a predetermined pattern to form a panel scintillator block.

At 414, the scintillator block is operably coupled to a photosensor (e.g., SiPM). The scintillator and photosensor are aligned so that the emission surface of the scintillator is oriented toward a surface of the photosensor configured to receive light energy. In various embodiments, the scintillator and the photosensor may define the same area, while in other embodiments the scintillator and the photosensor may define different areas. Further, the pixels of the photosensor and crystals of the scintillator may or may not align or match. In some embodiments, a light guide may be interposed between the scintillator and photosensor.

Figure 5:
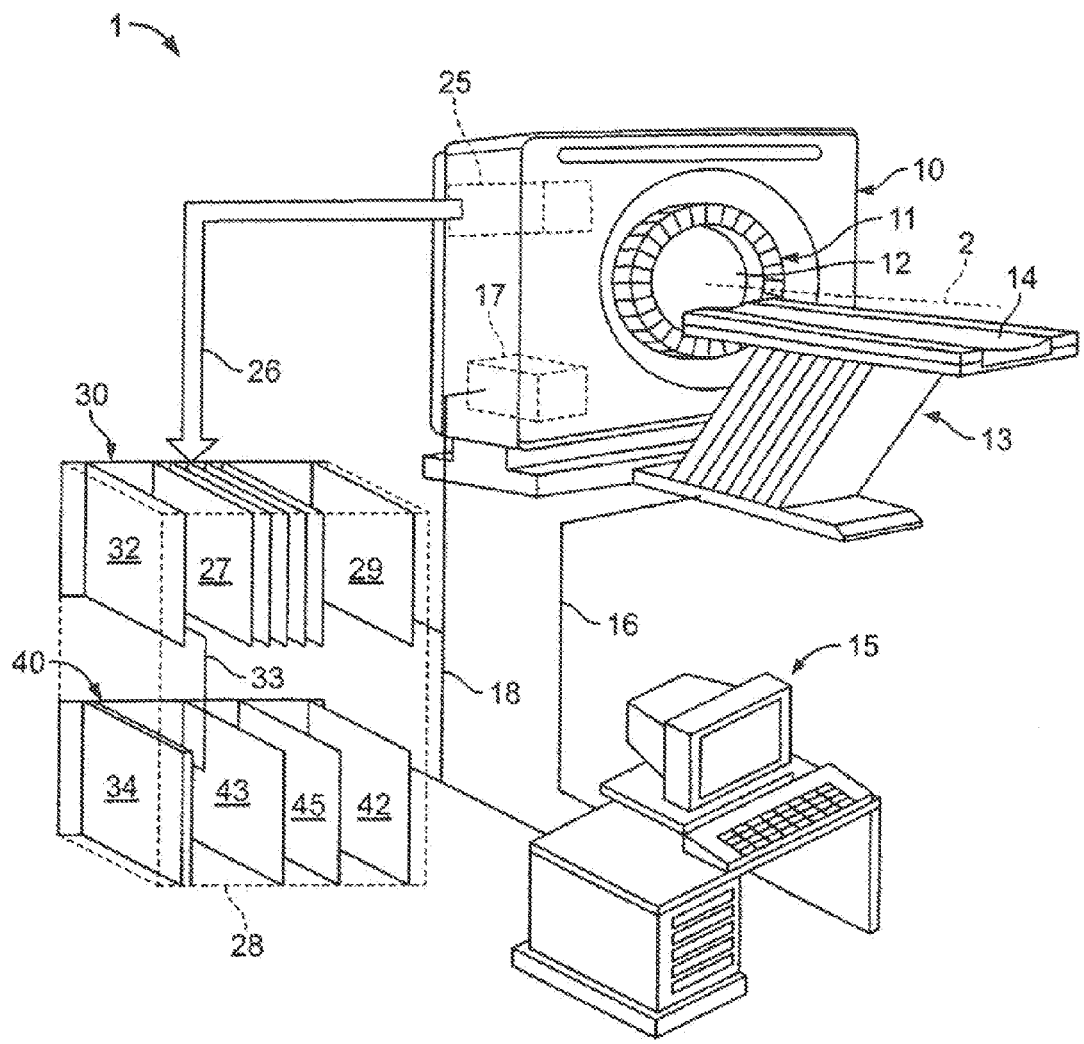
FIG. 5 illustrates an imaging system in accordance with various embodiments.
Figure 6:
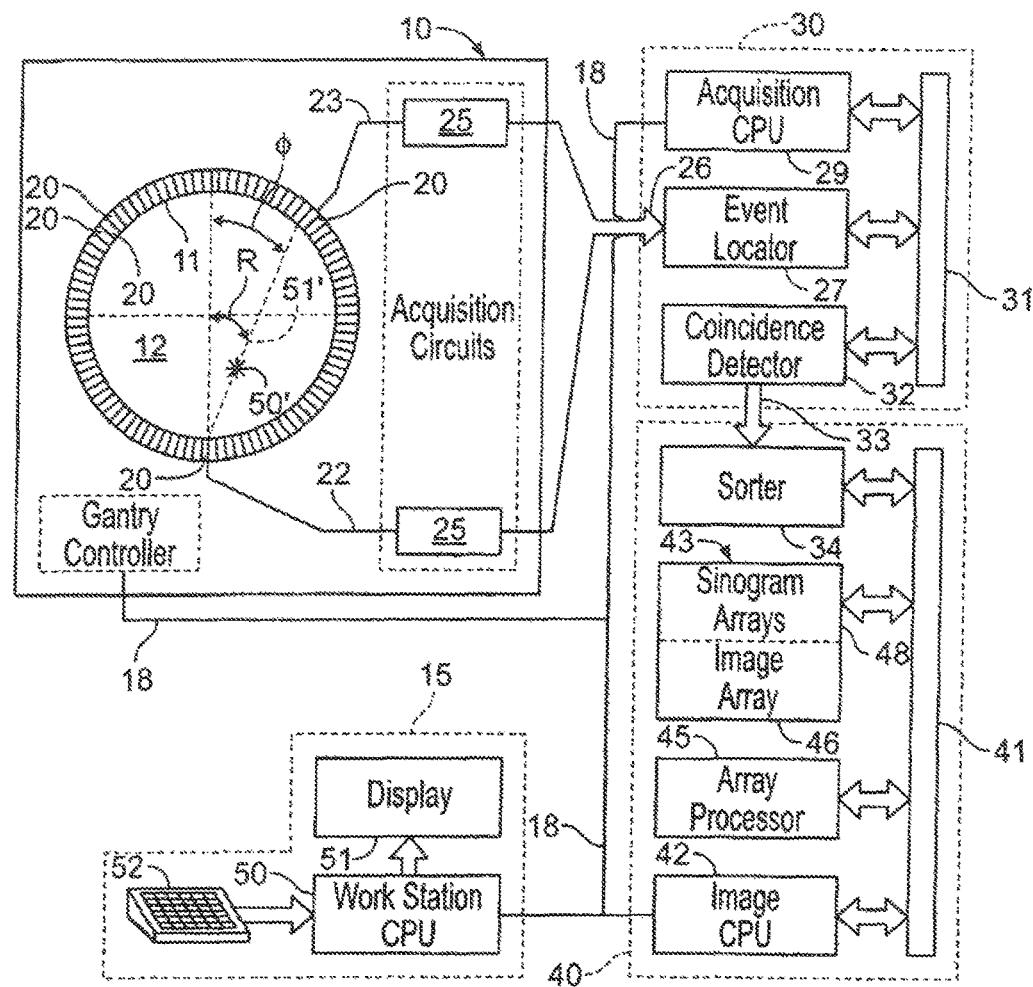
FIG. 6 is a schematic diagram of the imaging system of FIG. 5.
Figure 7:
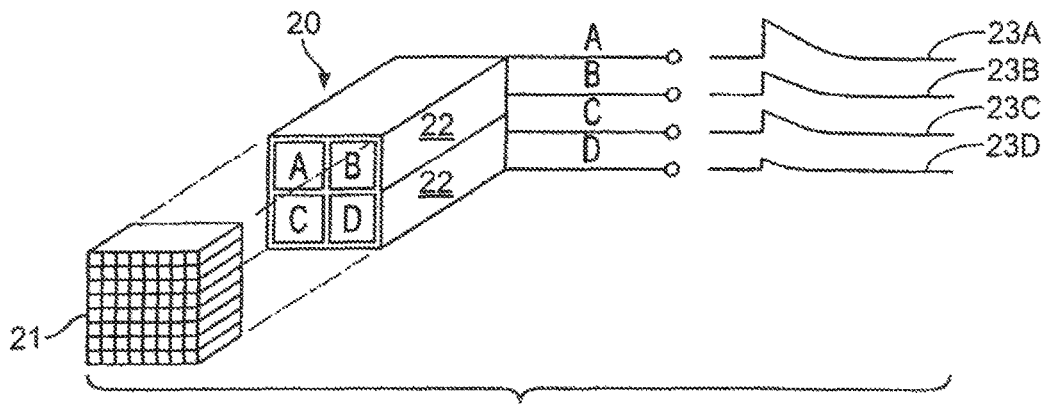
FIG. 7 illustrates an example of a detector module which forms part of the imaging system in accordance with various embodiments.

FIGS. 5-7 illustrate a PET imaging system with which various embodiments described herein may be employed. In other embodiments, crystal arrays as discussed herein may be utilized with other imaging systems (e.g., imaging systems configured for one or more additional or alternative modalities). FIG. 5 illustrates a PET scanning system 1 including a gantry 10 that supports a detector ring assembly 11 about a central opening or bore 12. The detector ring assembly 11 in the illustrated embodiments is generally circular and is made up of plural rings of detector 110 spaced along a central axis 2 to from a cylindrical detector ring assembly. In various embodiments, the detector ring assembly 11 may include 5 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 6, the operator work station 15 includes a central processing unit (CPU) 50, a display 51, and a keyboard 52. An operator may use the keyboard to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

The detector ring assembly 11 includes a number of detector modules. For example, the detector ring assembly 11 may include 36 detector modules, with each detector module including eight detector blocks. An example of one detector block 20 is shown in FIG. 7. The detector blocks 20 in a detector module may be arranged, for example, in a 2×4 configuration such that the circumference of the detector ring assembly 11 is 72 blocks around, and the width of the detector assembly 11 is 4 detector blocks wide. Each detector block 20 may include a number of individual detector crystals. In the illustrated embodiment, the array of detector crystals 21 is situated in front of four photosensors 22. The photosensors 22 are depicted schematically as photomultiplier tubes; however, it may be noted that SiPM's may be employed in various embodiments. Other configurations, sized and numbers of detector crystals, photosensors and detector modules may be employed in various embodiments.

During a PET scan, an annihilation photon may impact one of the detector crystals 21. The detector crystal 21, which may be formed, for example of lutetium yttrium silicate (LYSO) or bismuth germinate (BGO), for example, converts the annihilation photon into a number of photons which are received and detected by the photosensors. The photons generated by a detector crystal generally spread out to a certain extent and travel into adjacent detector crystals such that each of the four photosensors 22 receives a certain number photons as a result of an annihilation photon impacting a single detector crystal 21.

In response to a scintillation event, each photosensor 22 produces a signal 23A-23D on one of the lines A-D, as shown in FIG. 7, which rises sharply when a scintillation event occurs and then tails off exponentially. The relative magnitudes of the signals are determined by the position in the detector crystal array at which the scintillation event took place. The energy of the annihilation photon which caused the scintillation event determines the total magnitude of the four signals. The time that the signal begins to rise is determined by when the scintillation event occurs and the time required for photons to travel from the position of the scintillation event to the photosensors.

As shown in FIG. 6, a set of acquisition circuits 25 is mounted within the gantry 10 to receive the four signals from the detector block 20. The acquisition circuits 25 determine the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPU 29 which controls communications on the local area network 18 and a bus 31. The event locator circuits 27 assemble the information regarding each valid event into a set of digital numbers that indicated when the event took place and the identity of the detector crystal 21 which detected the event. The event locator circuits 27, for example, may use a detector position map to map a pair of coordinates to the detector 21 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., 6 nanoseconds. As another example, the locations indicated by the two event data packets may be required to lie on a straight line which passes through the field of view (FOV) of in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital number that precisely identify the locations of the two detector crystals 21 that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (θ) and pass through the scanner's field of view is a complete projection, or "view", which makes a set of sinogram. The distance (R) between a particular projection ray and the center of the field of view locates that projection ray within the view. As shown in FIG. 6, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the detector crystals 21 lying on the projection ray. During an emission scan, the coincidence counts are organized in memory 43, for example as a set of two-dimensional array, one for each axial image, and each having as one of its dimensions the projection angle θ and the other dimension the distance R. This θ by R map of the measured events may be referred to as sinogram array 48. The sorter 34 may also organize the coincidence events into other data formats. In a projection plane format, for example, other variables may be used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation photons by the patient, detector gain non-uniformities, random coincidences, and integrator dead time. Each row of the corrected sinogram array is then Fourier transformed by the array processor 45 and multiplied by a one-dimensional filter array. The filtered data is then invers Fourier transformed, and each array element is back projected to form the image array 46. The image CPU 42 may either store the image array data or output the data to the operator work station 15.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A scintillator crystal array configured to receive rays emitted by an object to be imaged and to emit light energy responsive to the received rays, the scintillator crystal array comprising plural crystals, at least one of the crystals comprising:
   an upper surface;
   a lower surface disposed opposite the upper surface;
   plural sides extending between the upper surface and the lower surface; and
   a micro-crack surface extending at least partially along at least one of the sides, the micro-crack surface comprising micro-cracks formed in the crystal configured for controlling distribution of light through the crystal, the micro-crack surface at least partially disposed on an exterior of the crystal that is immediately adjacent to a neighboring crystal of the scintillator crystal array, the micro-crack surface configured to control light spread from the crystal to the neighboring crystal.

2. The scintillator crystal array of claim 1, wherein a depth is defined extending from the upper surface to the lower surface, and wherein a width of the micro-crack surface varies along the depth.

3. The scintillator crystal array of claim 1, wherein the micro-crack surface is disposed on the at least one of the sides.

4. The scintillator crystal array of claim 1, wherein the micro-crack surface comprises a planar surface disposed on an interior of the crystal.

5. The scintillator crystal array of claim 1, wherein the micro-crack surface comprises plural planar surfaces disposed on an interior of the crystal.

6. The scintillator crystal array of claim 1, wherein the micro-crack surface comprises a first planar surface disposed on the at least one of the sides and at least one planar surface disposed on an interior of the crystal.

7. The scintillator crystal array of claim 1, wherein the micro-crack surface is a planar surface that is not parallel to the at least one of the sides along which the micro-crack surface extends.

8. The scintillator crystal array of claim 1, wherein the plural sides define a polygonal cross-section, wherein the at least one side along which the micro-crack surface extends comprises a single side.

9. The scintillator crystal array of claim 1, further comprising a reflector disposed around the sides of the scintillator crystal array surrounding the sides of the scintillator crystal array but not separating individual crystals of the crystal array, the reflector configured to reflect light directed from the sides of the scintillator crystal array back into the scintillator crystal array.

10. A detector system for imaging an object comprising:
   a scintillator block configured to receive rays from an object to be imaged and to emit light energy responsive to the received rays, the scintillator block including a scintillator crystal array comprising plural crystals, at least one of the crystals comprising:
   an upper surface;
   a lower surface disposed opposite the upper surface;
   plural sides extending between the upper surface and the lower surface; and
   a micro-crack surface extending at least partially along at least one of the sides, the micro-crack surface comprising micro-cracks formed in the crystal configured for controlling distribution of light through the crystal, the micro-crack surface at least partially disposed on an exterior of the crystal that is immediately adjacent to a neighboring crystal of the scintillator crystal array, the micro-crack surface configured to control light spread from the crystal to the neighboring crystal; and at least one photosensor configured to receive the light energy emitted from the scintillator crystal array.

11. The system of claim 10, wherein at least some crystals at least one of directly contact an adjacent crystal or are separated by adjacent crystals by only an airgap.

12. The detector system of claim 10, wherein the at least one photosensor comprises two photosensors, wherein the scintillator block is interposed between the photosensors, and the sides are configured to extend perpendicularly to a gamma ray source.

13. The detector system of claim 10, wherein the upper surface is configured to be oriented toward a gamma ray source and the lower surface is oriented toward the photosensor.

14. The detector system of claim 10, wherein a depth is defined extending from the upper surface to the lower surface, and wherein a width of the micro-crack surface varies along the depth.

15. The detector system of claim 10, wherein the micro-crack surface is disposed on the at least one of the sides.

16. The detector system of claim 10, wherein the micro-crack surface is a planar surface disposed on an interior of the crystal.

17. A method for providing a scintillator for imaging an object, the method comprising:
providing at least one crystal comprising:
an upper surface;
a lower surface disposed opposite the upper surface;
plural sides extending between the upper surface and the lower surface; and
a micro-crack surface extending at least partially along at least one of the sides, the micro-crack surface comprising micro-cracks formed in the crystal configured for controlling distribution of light through the crystal, the micro-crack surface at least partially disposed on an exterior of the crystal that is immediately adjacent to a neighboring crystal of the scintillator crystal array, the micro-crack surface configured to control light spread from the crystal to the neighboring crystal;
assembling the at least one crystal with plural additional crystals to form a scintillator crystal array; and
providing a reflector disposed around the sides of the scintillator crystal array, the reflector disposed around the sides of the crystal array surrounding the sides of the crystal array but not separating individual crystals of the array, the reflector configured to reflect light directed from the sides of the scintillator crystal array back into the scintillator crystal array.

18. The method of claim 17, wherein the scintillator crystal array is joined with other scintillator crystal arrays to form the scintillator block.

19. The method of claim 17, wherein the scintillator crystal array comprises plural crystals having corresponding micro-crack surfaces, and wherein assembling the at least one crystal with the plural additional crystals to form the scintillator crystal array includes orienting the micro-crack surfaces toward an interior of the scintillator crystal array.

20. The method of claim 17, wherein the scintillator crystal array comprises plural crystals having corresponding micro-crack surfaces, and wherein assembling the at least one crystal with the plural additional crystals to form the scintillator crystal array includes positioning the micro-crack surface of each crystal adjacent to and oriented toward a corresponding micro-crack surface of an adjacent crystal.

21. The method of claim 17, wherein providing the crystal includes'
saw cutting the crystal from a block of crystal material;
polishing the sides; and
applying laser energy to form the micro-crack surface.

* * * * *